United States Patent
Morgenroth

(10) Patent No.: US 11,139,674 B2
(45) Date of Patent: Oct. 5, 2021

(54) METHOD FOR OPERATING A MOTOR VEHICLE AND MANAGING THE CHARGING STATE OF A BATTERY

(71) Applicant: AUDI AG, Ingolstadt (DE)

(72) Inventor: Patrick Morgenroth, Albstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/108,404

(22) Filed: Aug. 22, 2018

(65) Prior Publication Data

US 2019/0118666 A1 Apr. 25, 2019

(30) Foreign Application Priority Data

Oct. 23, 2017 (DE) ..................... 10 2017 218 854.5

(51) Int. Cl.
*H02J 7/00* (2006.01)
*H02J 7/34* (2006.01)
(Continued)

(52) U.S. Cl.
CPC .............. *H02J 7/342* (2020.01); *B60L 53/16* (2019.02); *B60L 53/65* (2019.02); *B60L 58/12* (2019.02);
(Continued)

(58) Field of Classification Search
CPC ..... Y02T 90/14; Y02T 90/128; Y02T 91/163; Y02T 10/7005; Y02T 10/7088;
(Continued)

(56) References Cited

U.S. PATENT DOCUMENTS

| 9,260,024 B1* | 2/2016 | Lau | ........................ B60L 53/60 |
| 2012/0019204 A1* | 1/2012 | Matsuo | ................. H02J 7/0047 320/109 |

(Continued)

FOREIGN PATENT DOCUMENTS

| DE | 10 2009 028 565 A1 | 2/2011 |
| DE | 10 2011 013 453 A1 | 9/2012 |

(Continued)

OTHER PUBLICATIONS

Search Report dated Feb. 22, 2019 in corresponding European Application No. 18186304.4; 13 pages including partial machine-generated English-language translation.

(Continued)

*Primary Examiner* — Richard Isla
*Assistant Examiner* — Mohammed J Sharief
(74) *Attorney, Agent, or Firm* — Maier & Maier, PLLC

(57) ABSTRACT

A method for operating a motor vehicle, with an electric traction motor and a traction battery. When a state of discharge is present, charging information is relayed to at least one data receiving device external to the vehicle by means of a communication device of the motor vehicle by way of a data communication link. A state of discharge is present when a state of charge of the electrical energy stored in the traction battery is not sufficient to operate the traction motor, and/or when a state of charge of the electrical energy stored in the traction battery is not enough to reach the closest charging station to the position of the motor vehicle.

7 Claims, 1 Drawing Sheet

(51) Int. Cl.
   *B60L 53/16*         (2019.01)
   *B60L 53/65*         (2019.01)
   *B60L 58/12*         (2019.01)
   *B60L 53/10*            (2019.01)
   *B60P 1/64*             (2006.01)

(52) U.S. Cl.
   CPC ............ *H02J 7/0027* (2013.01); *B60L 53/11* (2019.02); *B60L 2240/622* (2013.01); *B60L 2240/72* (2013.01); *B60P 1/6409* (2013.01)

(58) Field of Classification Search
   CPC ....... H02J 7/0054; H02J 7/0027; B60L 53/16; B60L 53/65; B60L 53/11; B60L 53/00; B60L 53/50; B60L 53/51; B60L 53/52; B60L 53/53; B60L 53/54; B60L 53/55; B60L 53/56; B60L 53/57; B60L 53/67; B60L 53/68; B60P 1/6409
   USPC .................................................. 320/109, 104
   See application file for complete search history.

(56) References Cited

U.S. PATENT DOCUMENTS

| | | | | |
|---|---|---|---|---|
| 2012/0187916 | A1* | 7/2012 | Duer | B60L 58/13 |
| | | | | 320/136 |
| 2012/0193153 | A1 | 8/2012 | Wellborn et al. | |
| 2012/0193154 | A1 | 8/2012 | Wellborn et al. | |
| 2012/0203409 | A1 | 8/2012 | Sekijima et al. | |
| 2012/0303259 | A1* | 11/2012 | Prosser | H02J 7/342 |
| | | | | 701/400 |
| 2013/0020993 | A1 | 1/2013 | Taddeo et al. | |
| 2013/0175973 | A1* | 7/2013 | Jones | B60L 58/12 |
| | | | | 320/105 |
| 2014/0084843 | A1* | 3/2014 | Pham | B60L 58/21 |
| | | | | 320/103 |
| 2014/0188318 | A1 | 7/2014 | Langgood et al. | |
| 2016/0311357 | A1 | 10/2016 | Ortiz et al. | |
| 2017/0136897 | A1* | 5/2017 | Ricci | H02J 50/12 |
| 2017/0151884 | A1 | 6/2017 | Khosravi et al. | |
| 2018/0290561 | A1 | 10/2018 | Baumgartner | |
| 2020/0317067 | A1* | 10/2020 | Miller | B60L 53/126 |

FOREIGN PATENT DOCUMENTS

| | | |
|---|---|---|
| DE | 10 2012 214 750 A1 | 11/2013 |
| DE | 10 2013 206 903 A1 | 10/2014 |
| DE | 10 2015 205 811 A1 | 10/2016 |
| DE | 10 2015 214 901 A1 | 2/2017 |
| EP | 2 447 107 A2 | 5/2012 |
| EP | 2 894 436 A1 | 7/2015 |

OTHER PUBLICATIONS

"Lösungen für die Elektramobilität", Phoenix Contact, 2013; 15 pgs. https://www.phoenixcontact.com/assets/downloads_ed/global/web_dwl_promotion/Bro_E-Mobility_DE_low_final.pdf.

Examination Report dated Aug. 16, 2018 of corresponding German application No. 10 2017 218 854.5; 5 pgs.

European Office Action dated Feb. 6, 2020, in connection with corresponding EP Application No. 18 186 304.4 (11 pgs., including machine-generated English translation).

\* cited by examiner

METHOD FOR OPERATING A MOTOR VEHICLE AND MANAGING THE CHARGING STATE OF A BATTERY

FIELD

The invention relates to a method for operating a motor vehicle, wherein the motor vehicle comprises an electric traction motor and a traction battery. Furthermore, the invention relates to a motor vehicle.

BACKGROUND

Motor vehicles that have an electric traction motor and a traction battery for storing the electrical energy needed to operate the traction motor have a travel range that depends on the energy consumption during operation and the energy stored in the traction battery. A travel range prediction can be forecast with the aid of computational algorithms, wherein parameters of the previous energy consumption and the state of charge of the traction battery are used to determine the still available travel range, that is, the distance which can still be covered with the available energy. Now, if the energy consumption of the motor vehicle changes while driving, the travel range of the motor vehicle will also change correspondingly. If no more electrical energy is stored in the traction battery, the motor vehicle will stall and cannot move any further. In this case, it is necessary to recharge the traction battery in order to move the vehicle to a destination perhaps not yet attained. Different methods are known in the prior art for the charging of electric vehicles.

In DE 10 2011 013 453 A1, an energy distribution network is described for electric autos provided with rechargeable batteries. A first electric auto is connected by a charging cable to a charging station, while other electric autos are connected in treelike manner to each other by way of additional charging cables and also by way of the first electric auto to the charging station. The electric autos so joined together in this way may serve either as an energy sink or as an energy source. In this case, optionally, it is also possible for a transfer of energy to also occur between two vehicles without the involvement of the charging station. All the electric autos taking part in this method furthermore have a distinct identity code in order to make possible an accounting for the quantities of energy transferred.

DE 10 2015 214 901 A1 discloses a bridging device for the transfer of electrical energy between two vehicles. For this purpose, the bridging device has a first and a second connection side as well as a connection module. The connection module furthermore has a radio interface, which is equipped to output a radio signal reproducing the energy transferred between two vehicles connected to the respective connection sides and/or the state of at least one battery of one of the two vehicles. It is possible to transfer electrical energy from an onboard network or a battery of one vehicle to the onboard network or the battery of another vehicle via the bridging device.

DE 10 2009 028 565 A1 discloses a device for the charging of electrically propelled vehicles. In this case, the device, which is integrated in one vehicle, comprises a power transfer unit, which is electrically connected to the vehicle battery, and which is designed for the wireless transport of electrical energy to another power transfer unit of another motor vehicle. Thanks to the wireless transport of electrical energy from one vehicle to another vehicle, the battery of the other vehicle can be charged.

SUMMARY

Therefore, the object on which the invention is based is to indicate an improved method for the operation of a motor vehicle.

In order to achieve this object, it is proposed by the invention that charging information is relayed to at least one data receiving device external to the vehicle by means of a communication device of the motor vehicle by way of a data communication link, wherein a state of discharge is present when a state of charge of the electrical energy stored in the traction battery is not sufficient to operate the traction motor and/or when a state of charge of the electrical energy stored in the traction battery is not enough to reach the closest charging station to the position of the motor vehicle.

The benefit of the solution according to the invention is that charging information is relayed via the communication device in the motor vehicle to at least one data receiving device external to the vehicle, which can call attention to the state of discharge of the motor vehicle. The presence of the state of discharge means that the state of charge of the electrical energy stored in the traction battery is not enough to reach the closest charging station, and/or that the state of charge is no longer sufficient to operate the traction motor. Thus, the relaying of the charging information indicating such a state of discharge is produced when the motor vehicle has become stranded on account of lack of energy and can no longer be operated and/or when it is foreseeable that the closest charging station can no longer be reached with the electrical energy still available in the traction battery.

The closest charging station in this context means a charging station, whose position can be reached from the position of the motor vehicle by the shortest driving distance. This may be determined, for example, by a navigation device of the motor vehicle, in which the positions of charging posts are stored in memory. Whether the closest charging station can still be reached may be determined by the navigation device, for example, by a comparison of the required distance with travel information that is forecast on the basis of parameters of previous energy consumption and the state of charge of the traction battery.

It may be provided according to the invention that the charging information comprises the position data of the motor vehicle. The charging information thus contains, in addition to the presence of a state of discharge of the motor vehicle, the position data of the discharged motor vehicle. The data receiving device external to the vehicle is thus informed as to the current location of the motor vehicle. The data receiving device external to the vehicle may be, for example, a stationary computer or a server, or there may occur a relaying to a data receiving device external to the vehicle that is part of another motor vehicle.

In one preferred embodiment of the invention, it may be provided that the data communication device external to the vehicle is at least a navigation device of another motor vehicle. By the relaying of the charging information to the navigation device of the other motor vehicle, it is made possible for a driver of the other motor vehicle to respond to the state of discharge of the traction battery of the motor vehicle relaying the charging information. For example, it is possible, in the case of charging information that includes the position data of the motor vehicle, to indicate the position of the motor vehicle in the navigation device of the other motor vehicle. If the charging information does not include any position data of the motor vehicle, then it is possible for the navigation device of the other motor vehicle to request the position data of the motor vehicle via the data communication link in the communication device of the motor vehicle. It the position of the discharged motor vehicle is known, the driver of the other vehicle can head for the position of the motor vehicle to help it out.

For the position data of the motor vehicle it may be provided according to the invention that this is represented on a display unit of the navigation device and/or that a route from the position of the other motor vehicle to the motor vehicle is determined by the navigation device. In this way, the driver of the other vehicle can identify where the discharged motor vehicle is located and how the other motor vehicle can get to the motor vehicle. The position data may furthermore contain information as to whether the motor vehicle at the indicated position is situated on a hard shoulder, for example, or the place where it is parked, so that the motor vehicle can be easily identified by the other motor vehicle upon reaching the position of the motor vehicle. It is also conceivable for other additional information to be relayed, which makes it easier to identify the motor vehicle, such as, for example, a model designation and/or the paint color of the motor vehicle.

According to the invention, it may be provided that the other motor vehicle comprises an energy storage unit for the storing of electrical energy, a charging socket and a charging electronics, wherein the charging electronics is designed to carry out a charging process during which energy stored in the energy storage unit is delivered to a traction battery of a motor vehicle coupled to the charging socket. For example, for this purpose, the other motor vehicle can be parked at the position of the motor vehicle, behind or alongside the motor vehicle. Then the motor vehicle can be connected to the charging socket of the other motor vehicle. Because the charging electronics of the other motor vehicle is adapted to performing a charging process, the traction battery of the motor vehicle can be supplied with electrical energy from the energy storage unit of the other motor vehicle. In this way, the discharged traction battery of the motor vehicle is charged.

The energy storage unit of the other motor vehicle may be a traction energy storage unit of the other motor vehicle or an energy storage unit whose stored energy is not being used for the driving operation of the other motor vehicle, but instead is being carried along by the other motor vehicle for the purpose of charging the traction batteries of stranded motor vehicles or those of motor vehicles that can no longer reach the closest charging post. For this purpose, the other motor vehicle may be a roadside assistance vehicle of a repair service or the like, for example.

Furthermore, it may be provided according to the invention that the charging electronics of the other motor vehicle determines a limit value for the quantity of energy, and in the charging process a maximum quantity of energy corresponding to the limit value of the quantity of energy is transferred to the motor vehicle. The charging electronics may automatically determine a limit value of the quantity of energy or display this according to a specification of the driver of the other motor vehicle.

The limit value of the quantity of energy according to the invention may describe the quantity of energy needed by the motor vehicle to reach the closest charging station. In this case, to determine the limit value of the quantity of energy, the distance to be driven from the position of the motor vehicle to the nearest charging station may be taken into account. Alternatively, the limit value of the quantity of energy may also be a quantity of energy that allows the motor vehicle to drive an established distance. The established distance may be a value that commonly makes it possible to reach a charging station, such as 20 km, 50 km or 100 km.

According to the invention, it may be provided that a traction energy storage unit of the other motor vehicle is used as the energy storage unit, wherein, when determining the limit value of the quantity of energy, consideration is given to the quantity of energy required by the other motor vehicle in order to reach the charging station nearest to the position of the motor vehicle. This prevents the traction energy storage unit of the other motor vehicle from transferring such a quantity of energy to the motor vehicle that the other motor vehicle is no longer able to reach the closest charging station. By taking account of the quantity of energy needed by the other motor vehicle to reach the closest charging station, it is assured that only so much energy will be transferred to the traction battery of the motor vehicle that the other motor vehicle also remains able to reach at least the closest charging station.

According to the invention, it may be provided that the other motor vehicle is designed to determine a quantity of energy transferred during the charging process. In particular, it may be provided that the quantity of energy can be represented via a display unit of the other motor vehicle. In this way, the driver of the other motor vehicle knows the quantity of energy that was transferred from the energy storage unit of the other motor vehicle to the traction battery of the motor vehicle. This may be done, for example, for billing purposes, so that compensation can be determined for the energy provided. For example, in the case of another motor vehicle designed as a roadside assistance vehicle, this may be done at a fixed fee rate, whereas, in the case of a private vehicle as the other vehicle, compensation may be worked out between the drivers of the respective vehicles for the quantity of energy provided.

In order to connect the motor vehicle to the charging socket of the other motor vehicle it may be provided according to the invention that a charging cable is used, wherein a communication link between the motor vehicle and the other motor vehicle is operated across the charging cable for the transmittal of at least one item of information of state of charge. The information of state of charge may contain information about the traction battery and/or the energy storage unit and make possible, for example, the communication of battery management systems and charging electronics between the motor vehicle and the other motor vehicle. The information of state of charge may contain, for example, information about the state of charge of the traction battery and/or further information describing the charging process, such as the temperature of the traction battery, and/or a maximum charging current intensity. The information of state of charge may also contain information about the motor vehicle that indicates, for example, how much electrical energy is needed for a predetermined distance to the closest charging station.

It is provided for a motor vehicle according to the invention that it is designed to carry out a method according to the invention. For this purpose, it may be provided that the motor vehicle is designed to relay the charging information and/or the motor vehicle is designed to receive the charging information and to deliver energy stored in an energy storage unit via the charging socket. Preferably, the motor vehicle according to the invention is designed both to relay the charging information and to receive this information, as well as to deliver energy stored in an energy storage unit. In this way, the motor vehicle is able, by the method according to the invention, to request aid via the charging information in the event of a state of discharge of the traction battery, and, upon receiving charging information, and by the ability to deliver stored energy from an energy storage unit, also to help other motor vehicles that are discharged or stranded on the road.

BRIEF DESCRIPTION OF THE DRAWINGS

Further benefits and details of the invention will emerge from the following described exemplary embodiments as well as the drawings. Shown herein are.

DETAILED DESCRIPTION

Figure 1:
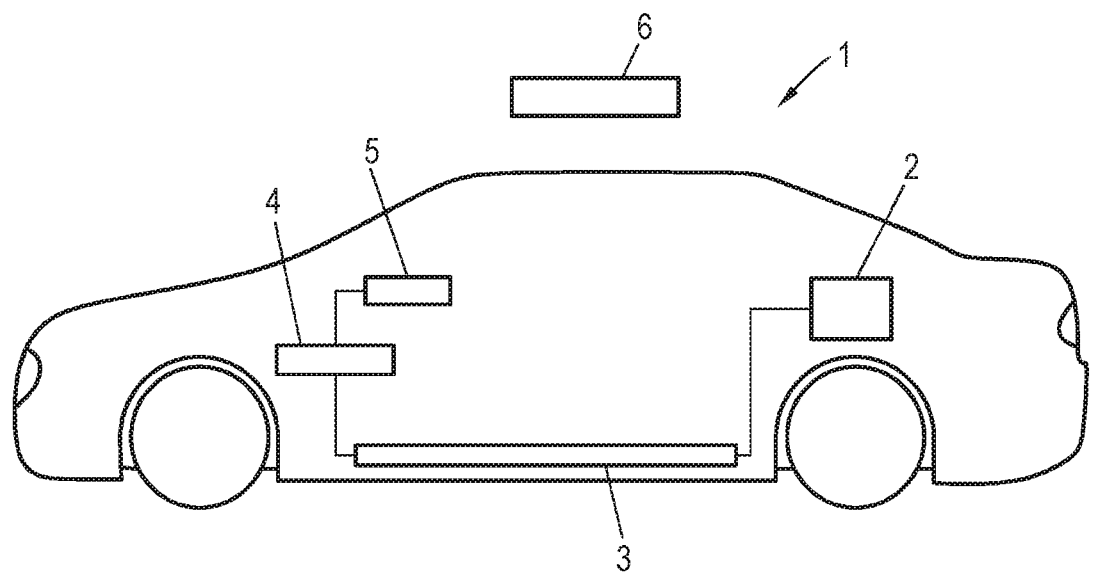
FIG. 1 a schematic side view of a motor vehicle according to the invention, as well as FIG. 2 a schematic representation of two motor vehicles according to the invention during a charging process.

A motor vehicle 1 according to the invention is shown in FIG. 1. The motor vehicle 1 comprises an electric traction motor 2 as well as a traction battery 3, which stores the necessary electrical energy for the operation of the electric traction motor 2. The traction battery 2 may be a bank of several battery cells or an energy storage unit formed from several capacitors. Furthermore, the motor vehicle 1 comprises a charging electronics 4 and a communication device 5. When a state of discharge of the motor vehicle 1 is present, i.e., when a state of charge of the electrical energy stored in the traction battery 3 is not sufficient to operate the traction motor 2, and/or when the state of charge of the electrical energy stored in the traction battery 3 is not enough to reach the closest charging station to the position of the motor vehicle 1, charging information is relayed by the communication device 5 via a data communication link to at least one data receiving device 6 external to the vehicle. The data receiving device 6 external to the vehicle may be a computer or a computing device that is connected to the data communication link. In particular, the data receiving device 6 external to the vehicle may be part of another motor vehicle 7, as shown in FIG. 2.

The state of charge of the traction battery 3 may be detected and evaluated by a control unit, for example, wherein the control unit can be part of the charging electronics 4 of the motor vehicle 1, for example. The communication device 5 of the motor vehicle 1 may be part of a navigation device, for example, in which the position data of various charging stations is stored, for example, so that it is possible to determine whether the state of charge of the traction battery 3 is sufficient to reach the charging station closest to the position of the motor vehicle, that is, the charging station to which the motor vehicle 1 must travel the least distance. The charging information relayed from the communication device 5 to the external data receiving device 6 may furthermore include the position data of the motor vehicle 1, so that the position of the motor vehicle 1 can be displayed and/or processed by the external data receiving device 6 or a device connected to it.

The external data receiving device 6 can be, for example, a navigation device of the other motor vehicle 7 or it can be connected to a navigation device of the other motor vehicle 7. This makes it possible to indicate the position of the discharged motor vehicle 1 on a display unit of the other motor vehicle 7, so that a driver of the other motor vehicle 7 can arrive at the discharged motor vehicle 1 to assist, by driving the other motor vehicle 7 to the position of the motor vehicle 1. The other motor vehicle can be, for example, a private motor vehicle or a roadside assistance vehicle of a repair service especially designed for roadside assistance, or the like. In order to facilitate the assistance by the other motor vehicle 7, it may be provided that the position data of the motor vehicle is represented on a display unit of the navigation device of the other motor vehicle 7 and/or that a route from the position of the other motor vehicle to the motor vehicle is ascertained by the navigation device. When the other motor vehicle 7 reaches the position of the motor vehicle 1, the other motor vehicle 7 can recharge the traction battery 3 of the discharged motor vehicle 1.

Figure 2:
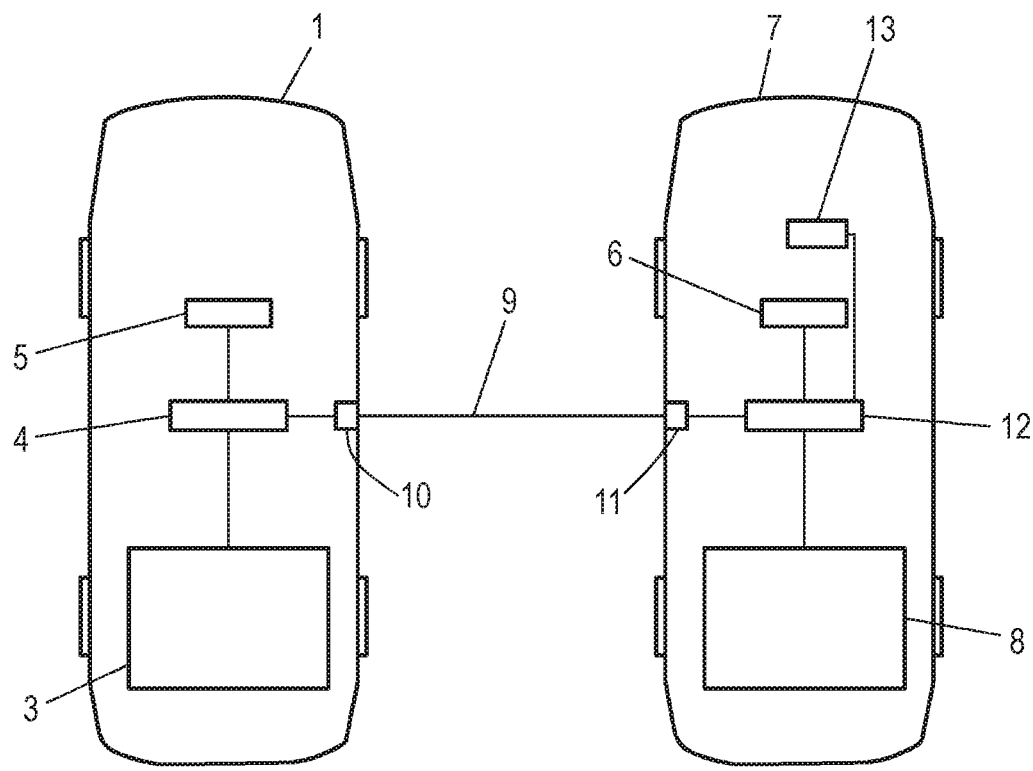

FIG. 2 shows a charging process during which energy from an energy storage unit 8 of the other motor vehicle 7 is transferred to the motor vehicle 1. The motor vehicle 1 and the other motor vehicle 7 are coupled by a charging cable 9, which is connected to a charging socket 10 of the motor vehicle 1 and to a charging socket 11 of the other motor vehicle 7. The other motor vehicle 7 comprises a charging electronics 12, which is designed to transfer electrical energy stored in the energy storage unit 8 of the motor vehicle 7 via the charging socket 11 to the traction battery 3 of the motor vehicle 1. The energy storage unit 8 of the other motor vehicle 7 may be a traction energy storage unit of the other motor vehicle 7 or an energy storage unit provided, for example, in a roadside assistance vehicle for the charging of discharged motor vehicles. Thanks to the charging electronics 12 of the other motor vehicle 7, a limit value of the quantity of energy can be determined that describes a maximum quantity of energy that is transferred in the charging process to the traction battery 3 of the motor vehicle 1. This limit value of the quantity of energy may take into account the quantity of energy that must be present in the traction battery 3 of the motor vehicle 1 in order for the motor vehicle 1 to reach the closest charging station. In addition, it may take into account the quantity of energy that the other motor vehicle 7 requires in order to reach the closest charging station to the current position of the motor vehicle 1. This prevents the transfer of such a quantity of energy from the other motor vehicle 7 to the motor vehicle 1 that would make it impossible for the other motor vehicle 7 to reach the closest charging station.

A communication link between the motor vehicle 1 and the other motor vehicle 7 can be established via the charging cable 9, which makes it possible to transmit information of the state of charge. The information of the state of charge may describe, for example, the current state of charge of the traction battery 3 or other parameters required for the charging process, such as the temperature of the traction battery 3, and/or the maximum possible charging current. The information of the state of charge is relayed by way of the communication link to the charging electronics 12 of the other motor vehicle 7. It is also possible to relay additional information, such as the energy consumption of the motor vehicle 1, and/or a quantity of energy needed to reach the closest charging station, by way of the charging cable 9 to the charging electronics 12 of the other motor vehicle 7.

After the energy transfer is complete, i.e., when the traction battery of the motor vehicle 1 has a state of charge that allows the motor vehicle 1 to reach at least the closest charging station to the current position, the total quantity of energy transferred from the energy storage unit 8 to the traction battery 3 can be indicated on a display unit 13 of the other motor vehicle 7. This total quantity of energy may be used for billing purposes or to determine compensation for the energy provided to the motor vehicle 1 by the other motor vehicle 7.

The invention claimed is:

1. A method for operating a first motor vehicle, wherein the first motor vehicle has an electric traction motor and a traction battery, comprising:

when a state of discharge is present, charging information is relayed from a communication device of the first motor vehicle to a receiving device external to the first motor vehicle, the receiving device external to the first motor vehicle comprising at least one navigation device of a second motor vehicle, by way of a data communication link, wherein the state of discharge is present when a state of charge of the electrical energy stored in the traction battery of the first motor vehicle is not sufficient to operate the electric traction motor, and/or when a state of charge of the electrical energy stored in the traction battery of the first motor vehicle is not enough to reach the closest charging station to a position of the first motor vehicle;

wherein the second motor vehicle has an energy storage unit for the storing of electrical energy, a charging socket, and a charging electronics, wherein the energy storage unit of the second motor vehicle comprises a traction energy storage unit of the second motor vehicle, wherein the charging electronics is designed to carry out a charging process in which energy stored in the energy storage unit is delivered to the traction battery of the first motor vehicle connected to the charging socket;

wherein the charging electronics of the second motor vehicle determines a limit value of a quantity of energy to be transferred to the first motor vehicle in the charging process such that no more energy than that prescribed by the limit value is transferred to the first motor vehicle through the charging process;

wherein the charging electronics of the second motor vehicle bounds the limit value on the basis of an amount of energy required by the second motor vehicle to reach the nearest charging station from the position of the first motor vehicle.

2. The method as claimed in claim 1, wherein the charging information comprises a position data of the first motor vehicle.

3. The method as claimed in claim 2, wherein the position data of the first motor vehicle is represented on a display unit of the navigation device, and/or in that a route from the position of the second motor vehicle to the first motor vehicle is determined by the navigation device.

4. The method as claimed in claim 1, wherein the limit value of the quantity of energy corresponds to an amount of energy needed by the first motor vehicle to reach the nearest charging station.

5. The method as claimed in claim 1, wherein the second motor vehicle is designed to determine a quantity of energy transferred during the charging process.

6. The method as claimed in claim 1, wherein a charging cable is used for connecting the first motor vehicle to the charging socket of the second motor vehicle, wherein a communication link between the first motor vehicle and the second motor vehicle is operated by way of the charging cable for the transmittal of at least one item of information regarding the state of charge.

7. The method as claimed in claim 1, wherein the limit value of the quantity of energy corresponds to an amount of energy needed by the first motor vehicle to drive a set distance.

* * * * *